United States Patent
Hernandez et al.

(12)

(10) Patent No.: US 12,442,313 B2
(45) Date of Patent: Oct. 14, 2025

(54) ADDITIVE MANUFACTURED BEARING CAP FOR TEMPERATURE REDUCTION ON BEARING CAP WETTED WALL

(71) Applicant: Solar Turbines Incorporated, San Diego, CA (US)

(72) Inventors: Jorge Hernandez, Long Beach, CA (US); Makarand A Sovani, San Diego, CA (US); Warner Tse, Culver City, CA (US); Geoffrey A Potts, Lakeside, CA (US)

(73) Assignee: Solar Turbines Incorporated, San Diego, CA (US)

( * ) Notice: Subject to any disclaimer, the term of this patent is extended or adjusted under 35 U.S.C. 154(b) by 124 days.

(21) Appl. No.: 18/237,780

(22) Filed: Aug. 24, 2023

(65) Prior Publication Data

US 2025/0067197 A1 Feb. 27, 2025

(51) Int. Cl.
| | |
|---|---|
| *F01D 25/16* | (2006.01) |
| *B33Y 10/00* | (2015.01) |
| *B33Y 80/00* | (2015.01) |
| *F01D 25/12* | (2006.01) |
| *F16C 33/66* | (2006.01) |

(52) U.S. Cl.
CPC .............. *F01D 25/16* (2013.01); *B33Y 10/00* (2014.12); *B33Y 80/00* (2014.12); *F01D 25/125* (2013.01); *F16C 33/667* (2013.01)

(58) Field of Classification Search
CPC ....... F01D 25/16; F01D 25/125; B33Y 10/00; B33Y 80/00; F16C 33/667
See application file for complete search history.

(56) References Cited

U.S. PATENT DOCUMENTS

| | | | |
|---|---|---|---|
| 9,951,811 B2 | 4/2018 | Mook et al. | |
| 10,167,734 B2 | 1/2019 | Sonokawa et al. | |
| 11,415,173 B2 | 8/2022 | Sottiaux et al. | |
| 2015/0139784 A1* | 5/2015 | Grelin | F01D 9/065 384/462 |
| 2015/0240660 A1* | 8/2015 | Sonokawa | F01D 25/16 415/111 |
| 2015/0369074 A1* | 12/2015 | Faulder | F01D 25/186 415/174.5 |
| 2020/0109646 A1* | 4/2020 | Black | F16C 33/6685 |

FOREIGN PATENT DOCUMENTS

EP 2873810 B2 7/2020

OTHER PUBLICATIONS

Written Opinion and International Search Report for Int'l. Patent Appln. No. PCT/US2024/039452, mailed Dec. 19, 2024 (13 pgs).

* cited by examiner

*Primary Examiner* — J. Todd Newton

(57) ABSTRACT

In a traditional bearing cap, the temperature of the oil-wetted surface that defines the oil sump may experience high temperatures, which can result in oil degradation, oil varnish, and coking. Accordingly, a bearing cap is disclosed that reduces the temperatures experienced by the oil-wetted surface. In particular, the bearing cap may comprise one or more air insulation cavities, between the surface that is exposed to heated air and the oil-wetted surface that defines the oil sump, to provide a thermal barrier between the two surfaces.

17 Claims, 10 Drawing Sheets

ADDITIVE MANUFACTURED BEARING CAP FOR TEMPERATURE REDUCTION ON BEARING CAP WETTED WALL

TECHNICAL FIELD

The embodiments described herein are generally directed to gas turbine engines, and, more particularly, to an additively manufactured bearing cap in a gas turbine engine that reduces temperatures on the oil-wetted wall.

BACKGROUND

A gas turbine engine includes a series of bearings along its length to minimize friction and ensure smooth rotation of the shaft. These bearings are typically housed within bearing caps. The bearing caps often create a boundary that encloses oil which creates an oil sump that acts as a reservoir for the lubricating oil, coming from downstream bearings, and providing lubrication to reduce friction and cooling to prevent overheating. Thus, each bearing cap may include an oil-wetted wall surface on one side of the bearing cap.

The oil-wetted wall surface can experience temperatures of over 400 degrees Fahrenheit. Such hot temperatures can result in oil degradation, oil varnish, and coking. This, in turn, can lead to blockage in the oil drain. In extreme cases, the oil degradation can result in a fire.

The present disclosure is directed toward overcoming this and other problems discovered by the inventors.

SUMMARY

In an embodiment, a bearing cap for a gas turbine engine, the bearing cap comprises: a first surface on a first side, wherein the first surface is annular around a longitudinal axis; a second surface on a second side that is opposite and downstream from the first side, wherein the second surface is annular around the longitudinal axis; and one or more air insulation cavities between the first surface and the second surface, wherein each of the one or more air insulation cavities is annular around the longitudinal axis.

In an embodiment, a method of manufacturing a bearing cap, the method comprising: printing the bearing cap in layers using additive manufacturing, such that the bearing cap includes a first surface on a first side, wherein the first surface is annular around a longitudinal axis, a second surface on a second side that is opposite and downstream from the first side, wherein the second surface is annular around the longitudinal axis, at least one air insulation cavity between the first surface and the second surface, wherein the at least one air insulation cavity is annular around the longitudinal axis, and one or more powder removal holes extending from one or both of a radially innermost end of the at least one air insulation cavity or a radially outermost end of the at least one air insulation cavity to an external environment of the bearing cap, wherein, in a cross-sectional plane that includes the longitudinal axis, a radially outer first portion of the at least one air insulation cavity extends away from the longitudinal axis and towards the second side at a first angle with respect to the longitudinal axis, a radially inner second portion of the at least one air insulation cavity extends away from the longitudinal axis and towards the first side at a second angle with respect to the longitudinal axis, and one or both of the radially innermost end of the at least one air insulation cavity or the radially outermost end of the at least one air insulation cavity has a teardrop shape; and sealing the one or more powder removal holes.

In an embodiment, a bearing cap for a gas turbine engine, the bearing cap comprises: a first surface on a first side, wherein the first surface is annular around a longitudinal axis; a second surface on a second side that is opposite and downstream from the first side, wherein the second surface is annular around the longitudinal axis and defines an oil sump on the second side; and a plurality of air insulation cavities between the first surface and the second surface, wherein each of the plurality of air insulation cavities is annular around the longitudinal axis, and wherein the plurality of air insulation cavities comprises a first air insulation cavity that, in a cross-sectional plane that includes the longitudinal axis, comprises a radially outer first portion that extends away from the longitudinal axis and towards the second side at a first non-zero angle with respect to the longitudinal axis, and a radially inner second portion that extends away from the longitudinal axis and towards the first side at a second non-zero angle with respect to the longitudinal axis, wherein a profile of the first air insulation cavity matches a profile of the oil sump, and a second air insulation cavity positioned downstream from a radially innermost end of the first air insulation cavity.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
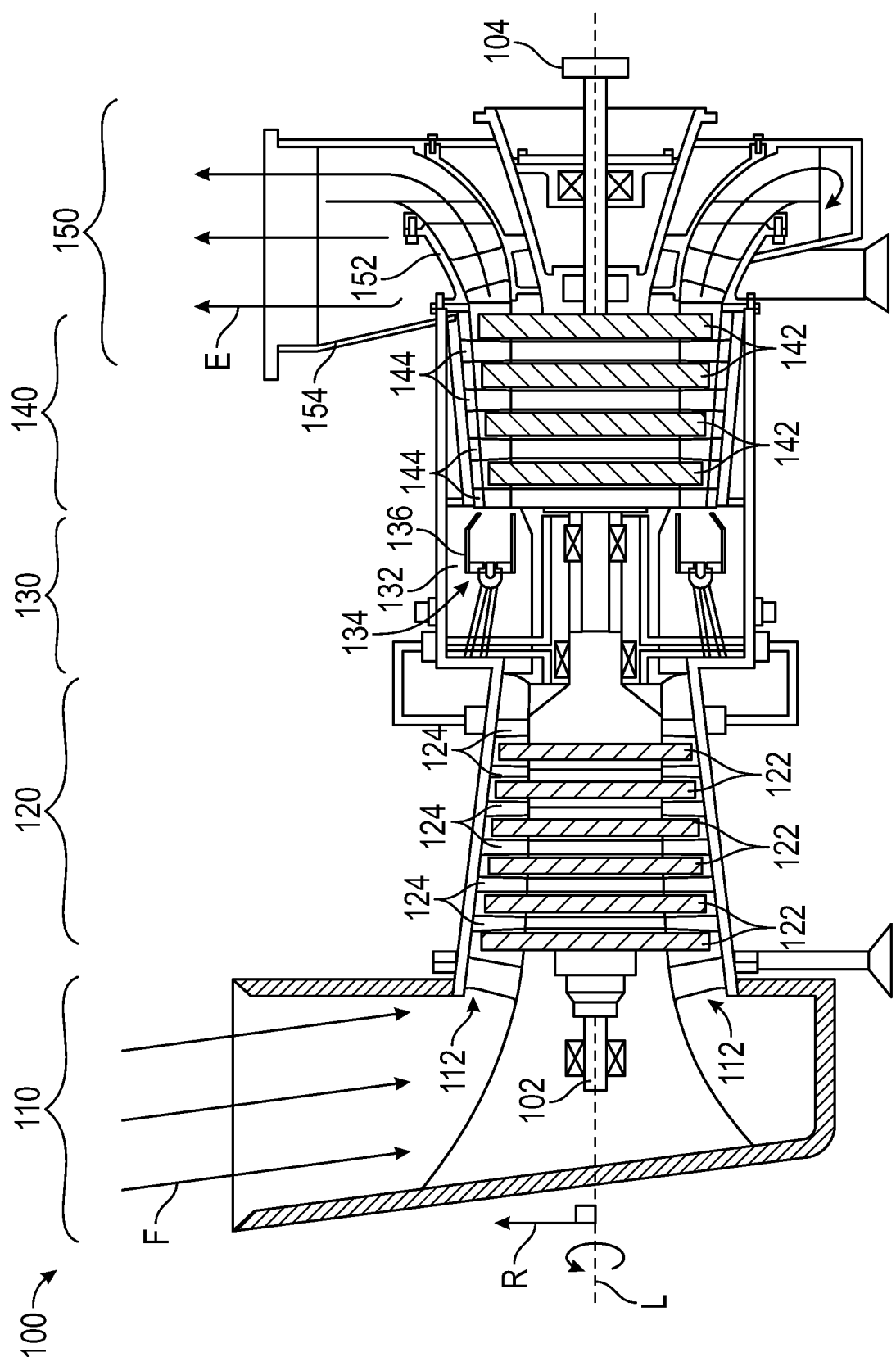
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description. In addition, it should be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular around longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer to or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
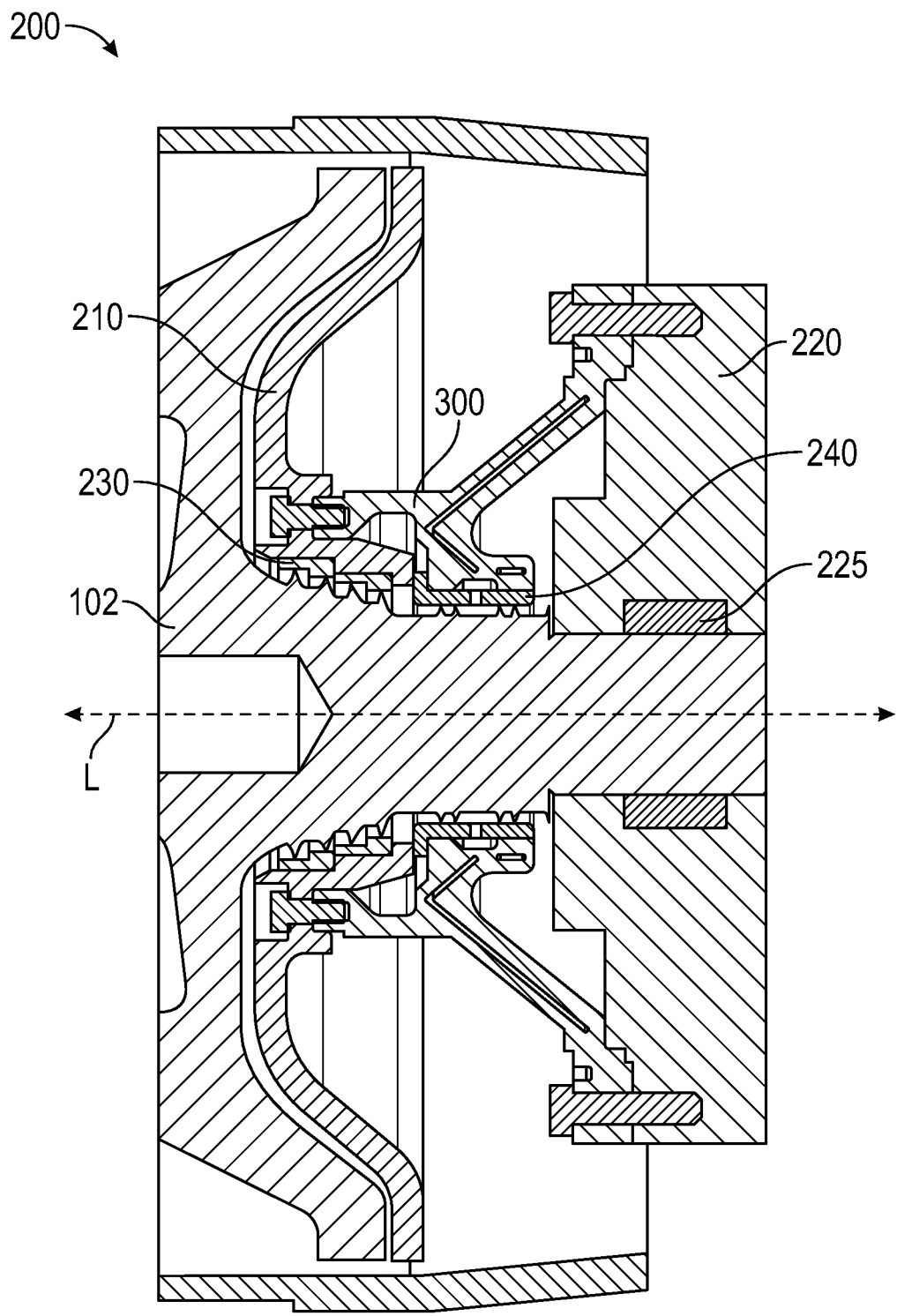
FIG. 2 illustrates a cross-sectional view of a bearing cap assembly, according to an embodiment.

FIG. 2 illustrates a cross-sectional view of bearing assembly 200, according to an embodiment. Bearing assembly 200 may be positioned between compressor 120 and combustor 130. Bearing assembly 200 may comprise a bearing cap shield 210, a bearing cap 300, downstream from and fastened to bearing cap shield 210, and a bearing system 220, downstream from and fastened to bearing cap 300. Bearing system 220 comprises bearings 225 that provide radial support to shaft 102. Bearing cap shield 210, bearing cap 300, and bearing system 220 are all annular around longitudinal axis L of gas turbine engine 100, so as to encircle shaft 102 at the downstream end of compressor 120. It should be understood that bearing assembly 200 is illustrated in isolation, and that, in practice, bearing assembly 200 would interface with other components of gas turbine engine 100.

Bearing cap shield 210 shields bearing cap 300. In particular, bearing cap shield 210 provides physical protection to bearing cap 300 and bearing system 220. Bearing cap shield 210 acts as a barrier to prevent the ingress of foreign objects, such as dust, dirt, or debris, into bearing system 220. By keeping these contaminants out, bearing cap shield 210 helps to maintain the integrity and performance of bearing system 220. Additionally, bearing cap shield 210 may provide thermal insulation to bearings 225. Gas turbine engine 100 may operate at high temperatures, and bearings 225 can be subjected to heat generated by the surrounding components. Bearing cap shield 210 may help minimize heat transfer to bearings 225, thereby protecting them from excessive thermal stress and ensuring their longevity. Furthermore, bearing cap shield 210 can act as a barrier to reduce the transmission of noise and vibrations from compressor 120 to downstream components, contributing to a quieter environment.

Bearing assembly 200 may comprise an air seal 230 between bearing cap shield 210 and shaft 102. In particular, air seal 230 may extend annularly around shaft 102, between an outer diameter of shaft 102 and an inner diameter of bearing cap shield 210. Air seal 230 prevents air from compressor 120 leaking downstream through bearing cap shield 210.

Bearing cap assembly 200 may comprise an oil seal 240 between bearing cap 300 and shaft 102. In particular, oil seal 240 may extend annularly around shaft 102, between an outer diameter of shaft 102 and an inner diameter of bearing cap 300. Oil seal 240 prevents lubricating oil from bearings 225 leaking upstream through bearing cap 300. In other words, oil seal 240 ensures that oil remains within the chamber around bearings 225. This oil helps to reduce friction, minimize wear, and dissipate heat generated during operation.

More generally, bearing cap assembly 200 may comprise one or more seal rings, including one or more of air seal 230 and/or oil seal 240. Each seal ring may encircle a central channel through bearing cap 300, through which shaft 102 extends. These seal rings prevent fluid (e.g., air, oil, etc.) from one side of bearing cap 300 leaking through to the other side of bearing cap 300.

Bearing cap 300 may prevent unwanted particles from entering the bearing system 220, ensuring the proper alignment and smooth operation of bearings 225. In particular, bearing cap 300 provides an enclosure that protects bearings 225 from external elements, such as dust, dirt, and debris, which can be detrimental to their performance and longevity. Additionally, bearing cap 300 may often create a boundary that encloses oil which creates an oil sump 425 that acts as a reservoir for the lubricating oil, allowing the controlled supply of lubricating oil to bearings 225, reducing friction, and minimizing wear due to high temperatures. Bearing cap 300 may be made of a nickel alloy, such as Alloy-X, Alloy-718, 17-4 PH Stainless Steel, or the like.

Figure 3:
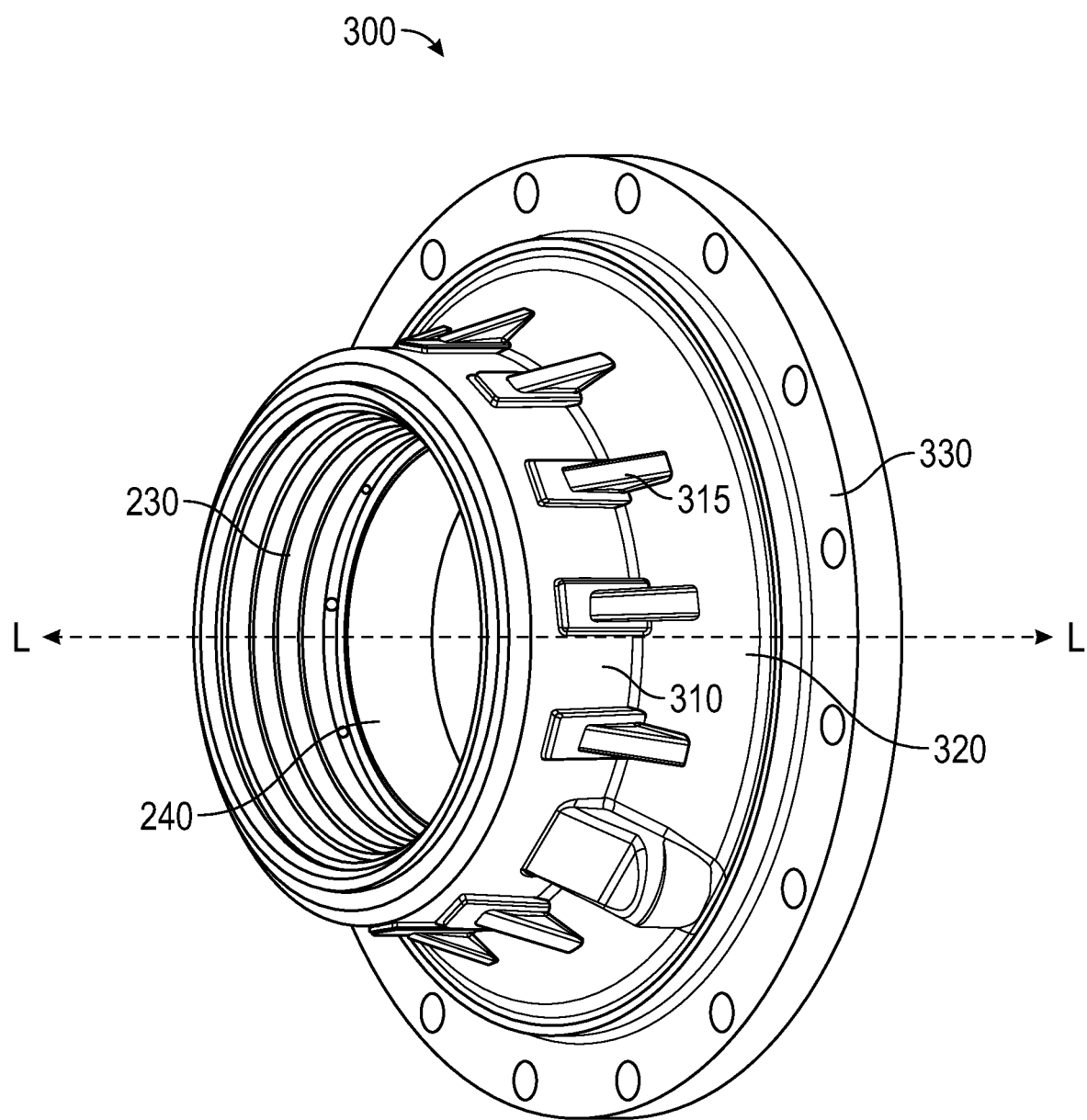
FIG. 3 illustrates a perspective view of a bearing cap, according to an embodiment.

FIG. 3 illustrates a perspective view of bearing cap 300, according to an embodiment. Each bearing cap 300 may comprise, in order from an upstream end to a downstream end, a main body 310, a conical portion 320, and a flange 330. Each of these components is annular around longitudinal axis L. In addition, bearing cap 300 may comprise one or more, and preferably a plurality of, stiffeners 315, arranged at equidistant intervals around longitudinal axis L.

Main body 310 is generally cylindrical. In the illustrated embodiment, air seal 230 and oil seal 240 are positioned on a radially inward facing surface of main body 310, with oil seal 240 downstream from air seal 230.

Conical portion 320 is generally cone-shaped. Conical portion 320 extends downstream and tapers radially outward from a downstream end of main body 310.

Each stiffener 315 may extend from a radially outward facing surface of main body 310 to a radially outward facing surface of conical portion 320 to stiffen the interface between the two components. In particular, stiffeners 315 provide reinforcement to enhance the rigidity and strength of bearing cap 300. Stiffeners 315 may be secondary plates or sections that stiffen conical portion 320 against out-of-plane deformations. Stiffeners 315 may be connected to main body 310 and conical portion 320 through welding or other means, or may be additively manufactured with the other components of bearing cap 300.

Flange 330 is generally disk-shaped. Flange 330 extends radially outward from a downstream end of conical portion 320. Flange 330 may comprise a plurality of axial apertures, arranged at equidistant intervals around longitudinal axis L. Each aperture may be configured to enable a bolt or other fastener to be inserted therethrough. Flange 330 enables bearing cap 300 to be bolted to another component of gas turbine engine 100 that is downstream from bearing cap 300.

Figure 4A:
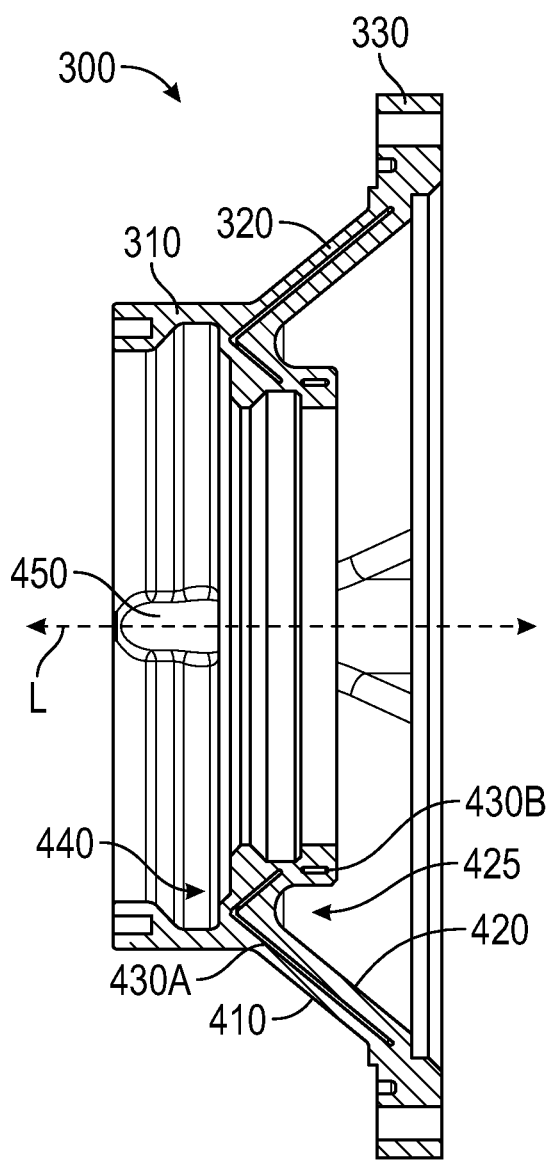
FIGS. 4A and 4B illustrate cross-sectional views of a bearing cap in two different cross-sectional planes, according to an embodiment.

FIG. 4A illustrates a cross-sectional view of bearing cap 300 in a first cross-sectional plane, according to an embodiment. It should be understood that the cross-sectional plane includes longitudinal axis L. Bearing cap 300 comprises a first surface 410 on a first side, and a second surface 420 on a second side that is opposite the first side. It is contemplated that the first side is the upstream side of bearing cap 300, such that first surface 410 is exposed to working fluid F (e.g., air) output by compressor 120, whereas the second side is the downstream side of bearing cap 300, such that second surface 420 is wetted with lubricating oil for bearings 225. First surface 410 is heated by working fluid F. This heat will generally be transferred via conduction through main body 310 and/or conical portion 320 towards second surface 420.

In an embodiment, second surface 420 defines an oil sump 425. Oil sump 425 is a cavity or recess that acts as a reservoir for the lubricating oil, coming from downstream bearings 225, to cool prior to leaving through drains. In practice, oil sump 425 will contain lubricating oil coming from downstream bearings 225. As a result, second surface 420 will be wetted with oil and may help to cool down bearing cap 300 during operation of gas turbine engine 100.

Bearing cap 300 may comprise one or more air insulation cavities 430, illustrated as first air insulation cavity 430A and second air insulation cavity 430B. In an alternative embodiment, bearing cap 300 could consist of only a single air insulation cavity 430 (e.g., 430A or 430B) or three or more air insulation cavities 430. The number of air insulation cavities 430 may depend on the manufacturing process for bearing cap 300, the shape and/or dimensions of bearing cap 300, and/or other design considerations. For example, first air insulation cavity 430A and second air insulation cavity 430B could instead be joined into a single air insulation cavity 430. However, this may produce too much stress in the single air insulation cavity 430. Accordingly, in the illustrated embodiment, air insulation cavity 430 has been split into first air insulation cavity 430A and second air insulation cavity 430B to reduce the overall stress from the air insulation feature.

Each air insulation cavity 430 provides a thermal barrier that reduces the heat transfer from one side of bearing cap 300 to the opposing side of bearing cap 300, including from first surface 410 to second surface 420. In particular, there is reduced heat transfer to oil sump 425. In addition, each air insulation cavity 430 reduces the mass and weight of bearing cap 300. Air insulation cavity(ies) 430 may be formed to generally match the contour(s) of first surface 410 and/or second surface 420. The thickness of each air insulation cavity 430 may be chosen to balance the reduction in heat transfer provided by a thicker air insulation cavity 430 (e.g., at least 0.05 inches thick), with the structural integrity of the walls, between first surface 410 and air insulation cavity 430 and between second surface 420 and air insulation cavity 430, so that such walls remain structurally sound (e.g., at least 0.2 inches thick). In an embodiment in which additive manufacturing is used to construct bearing cap 300, the thickness of each air insulation cavity 430 should also be sufficient to enable the removal of powder from air insulation cavity 430. The thickness of the first wall between first surface 410 and air insulation cavity 430 and the second wall between second surface 420 may be the same. Alternatively, the thickness of the first wall and the second wall may be different. For example, the first wall may be thicker to stiffen first surface 410 and reduce bulk stresses on first surface 410.

Bearing cap 300 may comprise a mixed air cavity 440 which captures pressure compressor discharge (PCD) from compressor 120. Mixed air cavity 440, which may be upstream from air insulation cavity(ies) 430, may be annular around longitudinal axis L. Mixed air cavity 440 is in fluid communication with a mixed air channel 450. The working fluid F in mixed air cavity 440 flows through mixed air channel 450 to a system that buffers working fluid F for turbine 140. For example, this working fluid F may be used to cool components of turbine 140, for example, by creating a barrier of cooler air around hot components, such as turbine blades or combustor liners.

Figure 4B:
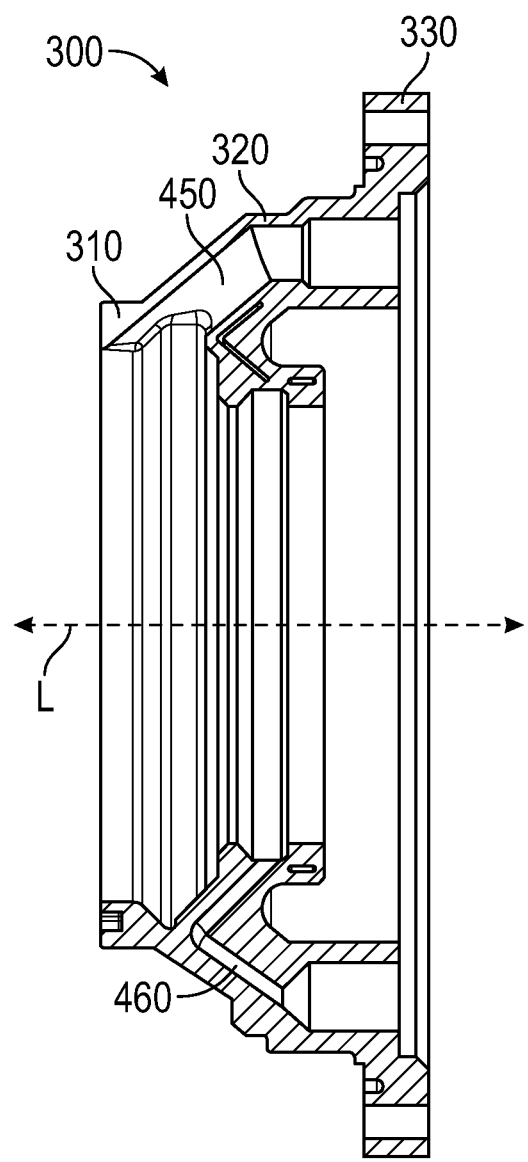

FIG. 4B illustrates a cross-sectional view of bearing cap 300 in a second cross-sectional plane, according to an embodiment. In particular, the cross-sectional plane illustrated in FIG. 4B is rotated 90 degrees around longitudinal axis L, relative to the cross-sectional plane illustrated in FIG. 4A. As illustrated in this view, bearing cap 300 may comprise a buffer air channel 460. Buffer air channel 460 may be in fluid communication with a system that buffers cooled working fluid F from compressor 120 to other components of gas turbine engine 100, such as oil seal 240.

Figure 5A:
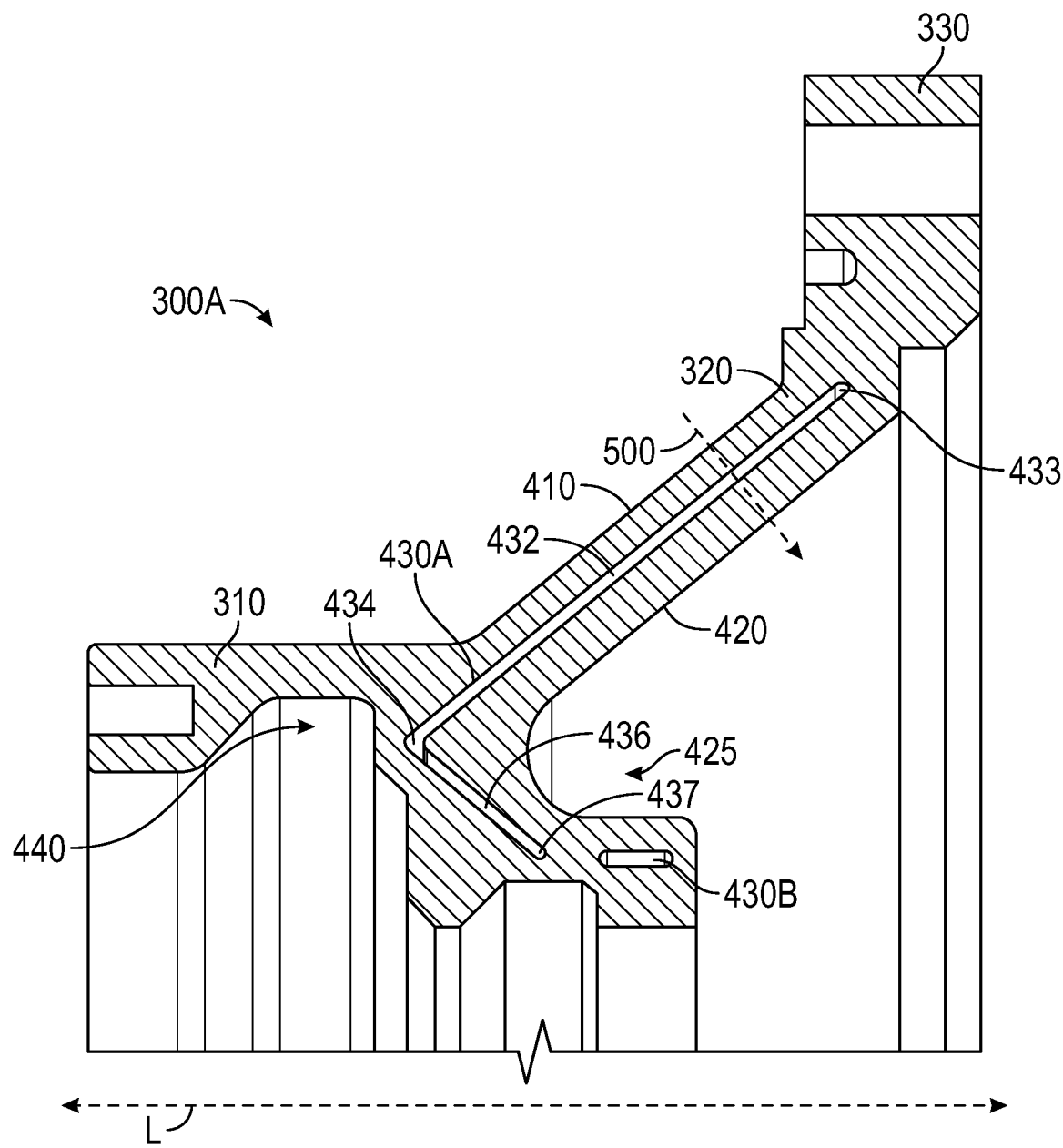
FIGS. 5A-5C illustrate perspective cross-sectional views of a portion of a bearing cap, according to alternative embodiments.

FIG. 5A illustrates a cross-sectional view of a portion of bearing cap 300A, according to a first embodiment. Bearing cap 300A comprises a first air insulation cavity 430A and a second air insulation cavity 430B. A primary heat flux direction 500 is from first surface 410 to second surface 420, and crosses through first air insulation cavity 430A. Experimentation through computer simulation for one particular implementation of this first embodiment demonstrated that the hot-mass/cold-mass ratio, representing a mass ratio to determine the structural integrity, was approximately 1.23. The higher the ratio, the more hot-mass and the more stress experienced on the cold side.

First air insulation cavity 430A comprises a first portion 432, extending from a first end 433 to a vertex 434, and a second portion 436, extending from vertex 434 to a second end 437. In a cross-sectional plane that includes longitudinal axis L, first portion 432, which is radially outward from second portion 436, extends away from longitudinal axis L and towards the side of bearing cap 300A on which second surface 420 is located, at a first angle with respect to longitudinal axis L. In this same cross-sectional plane, second portion 436, which is radially inward from first portion 432, extends away from longitudinal axis L and towards the side of bearing cap 300A on which first surface 410 is located, at a second angle with respect to longitudinal axis L. The first angle and the second angle may be different. For example, the first angle may between 40 and 55 degrees (e.g., 45-50 degrees), and the second angle may be between 130 and 145 degrees (e.g., 135-140 degrees). More generally, one or both of first portion 432 or second portion 436 may extend away from longitudinal L axis at a non-zero and/or non-perpendicular angle with respect to longitudinal axis L.

First air insulation cavity 430A is shaped to generally follow the contours of first surface 410 and second surface 420, and preferably, to follow the contour of oil sump 425, but using a substantially right angle at vertex 434 to aid in the additive manufacturing process. For example, the angle between first portion 432 and second portion 436 may be between 40 and 55 degrees, and preferably around 45 to 50 degrees.

Second air insulation cavity 430B, which is downstream from first air insulation cavity 430A, is substantially parallel to longitudinal axis L and shorter in total length than first air insulation cavity 430A. Essentially, second air insulation cavity 430B forms a radially inner border along oil sump 425, to reduce heat flux from a radially inward facing portion of first surface 410 towards second surface 420. In an alternative embodiment, second air insulation cavity 430B could be extended axially upstream to join second end 437 of first air insulation cavity 430A, to thereby form a single continuous air insulation cavity 430. However, this may not be practical for an additive manufacturing process. Accordingly, in the illustrated embodiment, air insulation cavity 430 is separated into first air insulation cavity 430A and second air insulation cavity 430B. More generally, air insulation cavity(ies) 430, whether a single continuous air insulation cavity 430 are a plurality of discrete air insulation cavities 430, have a profile that matches the profile of oil sump 425, but using two or more linear segments.

Figure 6A:
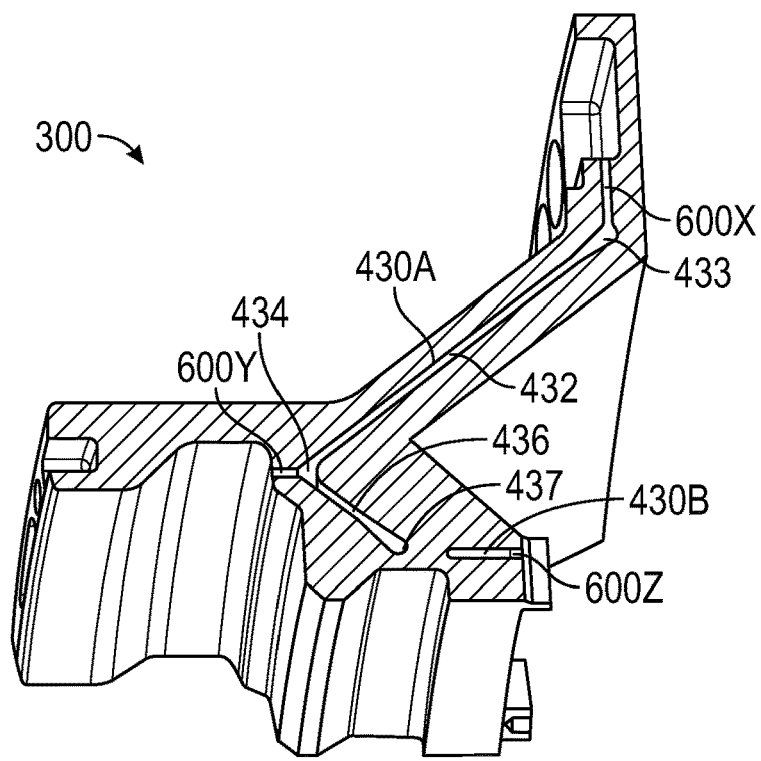
FIGS. 6A and 6B illustrate the placement of powder removal holes in perspective cross-sectional views of segments of a bearing cap, according to alternative embodiments.
Figure 6B:
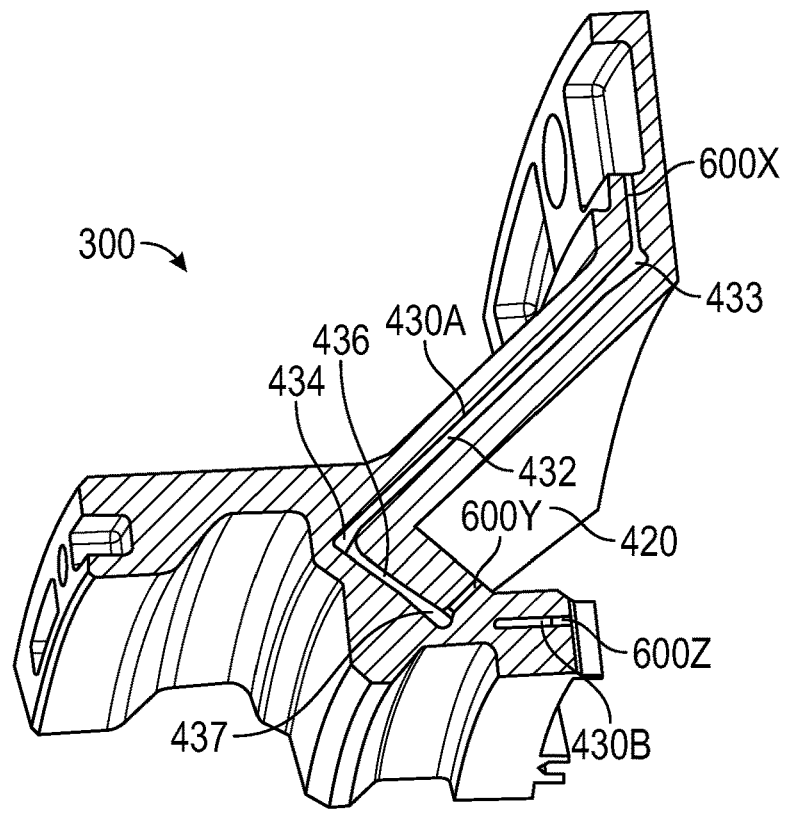

In an embodiment, one or both of first end 433, which is the radially outermost end of first air insulation cavity 430A, or second end 437, which is the radially innermost end of first air insulation cavity 430A, may have a teardrop shape. Similarly, the ends of second air insulation cavity 430B may have a teardrop shape (as shown in FIGS. 6A and 6B). More generally, the ends of any air insulation cavity 430 may have a teardrop shape. This teardrop shape reduces the stress at these fillet points.

Figure 5B:
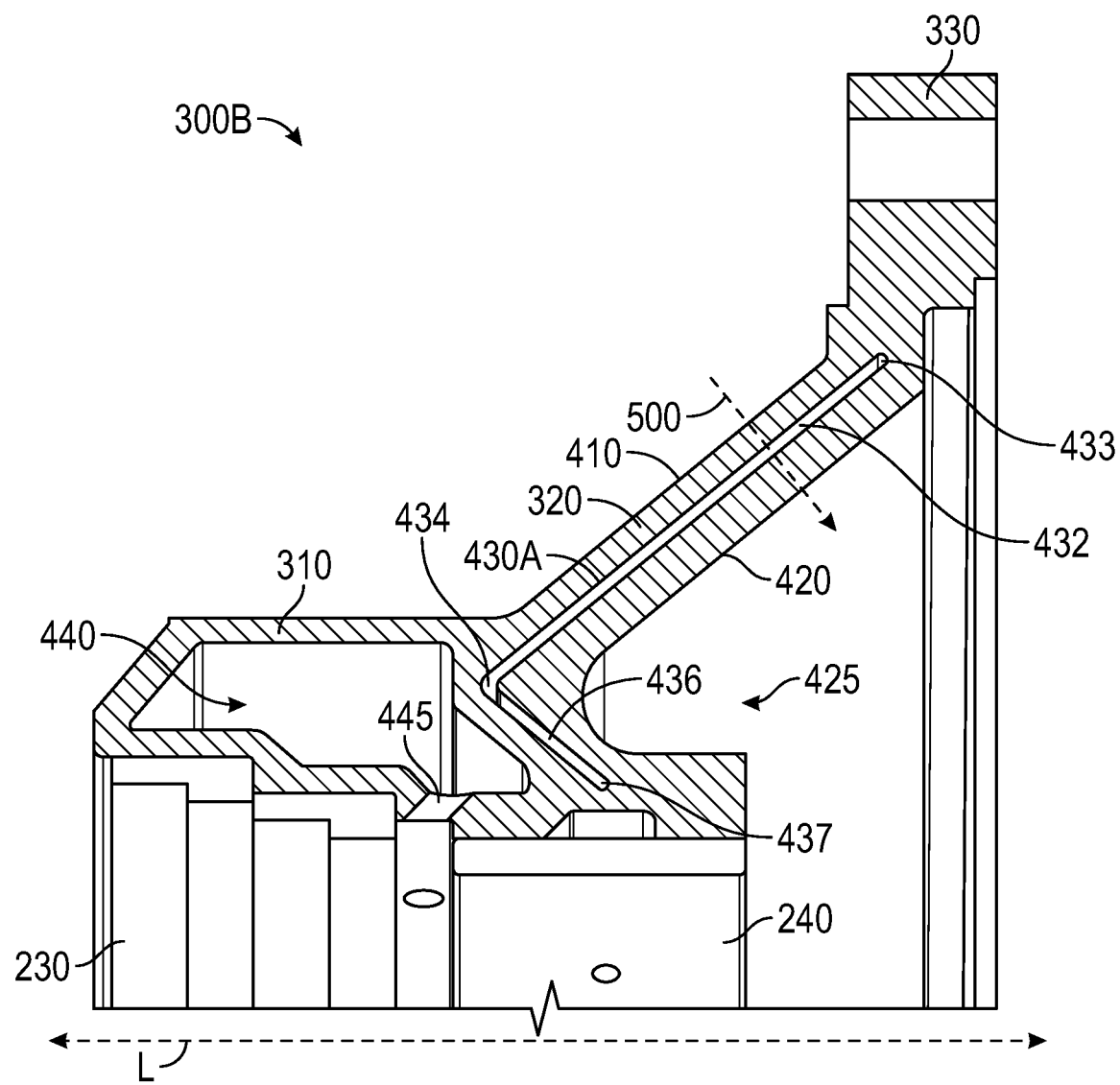

FIG. 5B illustrates a cross-sectional view of a portion of bearing cap 300B, according to a second embodiment. As in the first embodiment of bearing cap 300A, bearing cap 300B comprises first air insulation cavity 430A. However, bearing cap 300B does not comprise a second air insulation cavity 430B. In addition, bearing cap 300B comprises an enclosed mixed air cavity 440. In all other respects, bearing cap 300B may be identical or similar to bearing cap 300A. Thus, it should be understood that any description of a component with respect to bearing cap 300A, which is also present in bearing cap 300B, may apply equally to that component in bearing cap 300B. Experimentation through computer simulation one particular implementation of this second embodiment demonstrated that the hot-mass/cold-mass ratio was approximately 1.29.

Because mixed air cavity 440 is enclosed, bearing cap 300B may comprise one or more mixed air inlets 445 in fluid communication with mixed air cavity 440. Thus, air may flow from a radially inner environment of bearing cap 300B, through mixed air inlet(s) 445, into mixed air cavity 440 (e.g., where it may flow into a mixed air channel 450—see FIGS. 4A, 4B). In an embodiment, bearing cap 300B may comprise a plurality of mixed air inlets 445, oriented radially and positioned at equidistant intervals around an inner circumference of bearing cap 300B, for example, between air seal 230 and oil seal 240. Further, the additive manufacturing may be designed to have mixed air inlets 445 used as powder removal outlets to allow a faster powder removal.

Figure 5C:
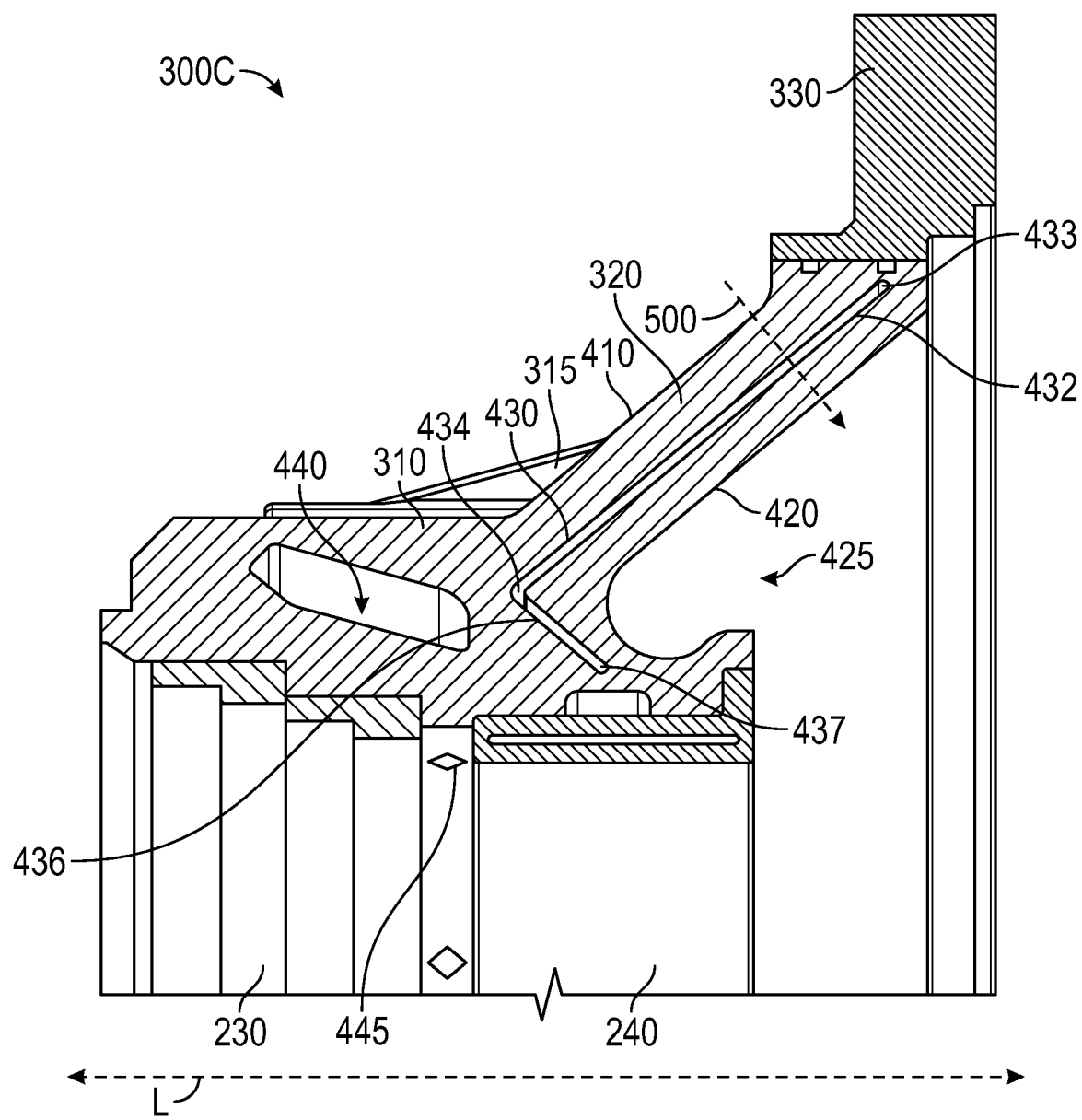

FIG. 5C illustrates a cross-sectional view of a portion of bearing cap 300C, according to a third embodiment. Bearing cap 300C is similar to bearing cap 300B in the second embodiment, but comprises a smaller mixed air cavity 440 than in bearing cap 300B. In all other respects, bearing cap 300C may be identical or similar to bearing cap 300B. Thus, it should be understood that any description of a component with respect to bearing cap 300B, which is also present in bearing cap 300C, may apply equally to that component in bearing cap 300C. Experimentation through computer simulation for one particular implementation of this third embodiment demonstrated that the hot-mass/cold-mass ratio was approximately 2.61. In addition, the third embodiment has substantially more hot-side mass than the second embodiment.

FIG. 6A illustrates the placement of powder removal holes 600 in a perspective cross-sectional view of a segment of a bearing cap 300, according to a first embodiment. In this first embodiment, a first powder removal hole 600X is radially oriented and positioned at first end 433 of first air insulation cavity 430A, a second powder removal hole 600Y is axially oriented and positioned at vertex 434 of first air insulation cavity 430A, and a third powder removal hole 600Z is axially oriented and positioned at a downstream end of second air insulation cavity 430B.

FIG. 6B illustrates the placement of powder removal holes 600 in a perspective cross-sectional view of a segment of a bearing cap 300, according to a second embodiment. In this second embodiment, first powder removal hole 600X and third powder removal hole 600Z are the same as in the first embodiment. However, in the second embodiment, second powder removal hole 600Y is positioned at second end 437 of first air insulation cavity 430A. In addition, second powder removal hole 600Y is oriented to be perpendicular to the portion of second surface 420 that is closed to second end 437.

Each powder removal hole 600 comprises a channel from an air insulation cavity 430 to an external environment of bearing cap 300. Powder removal hole 600 enables powder, generated during the additive manufacturing process, to be flushed out of air insulation cavity(ies) 430, using, for example, a fluid (e.g., air, liquid, etc.) and/or gravity. It should be understood that each powder removal hole 600 may be printed during the additive manufacturing process.

Figure 7:
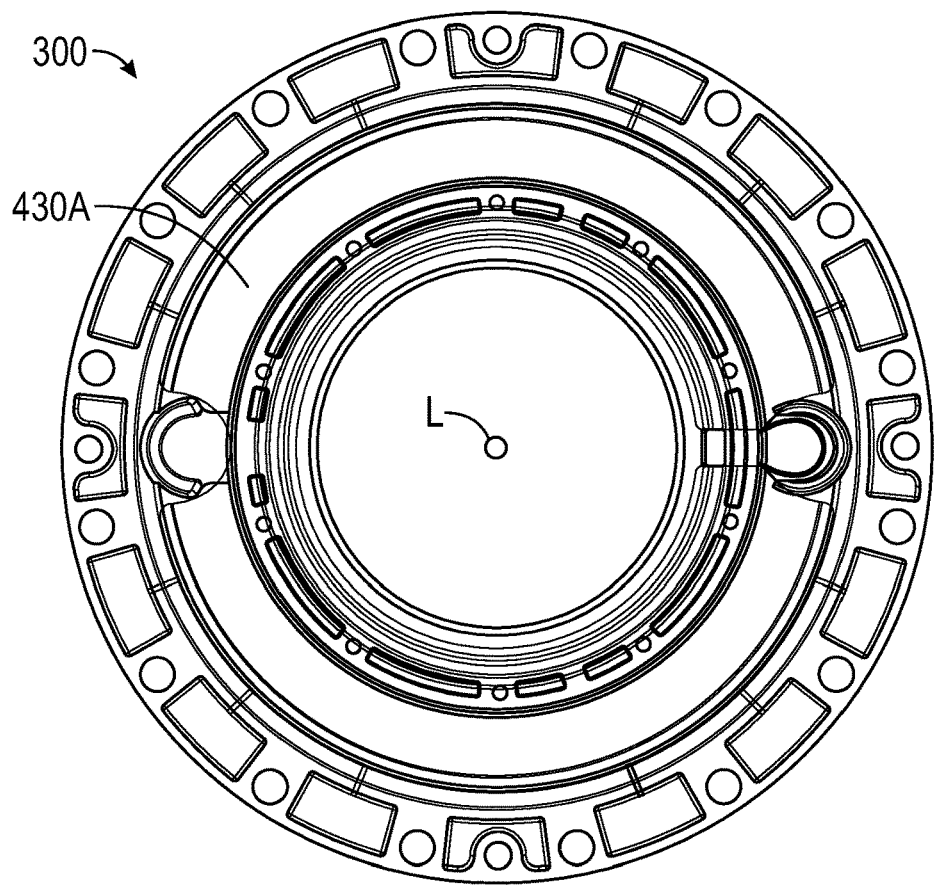
FIG. 7 illustrates an air insulation cavity within a bearing cap, according to an embodiment.
Figure 7:
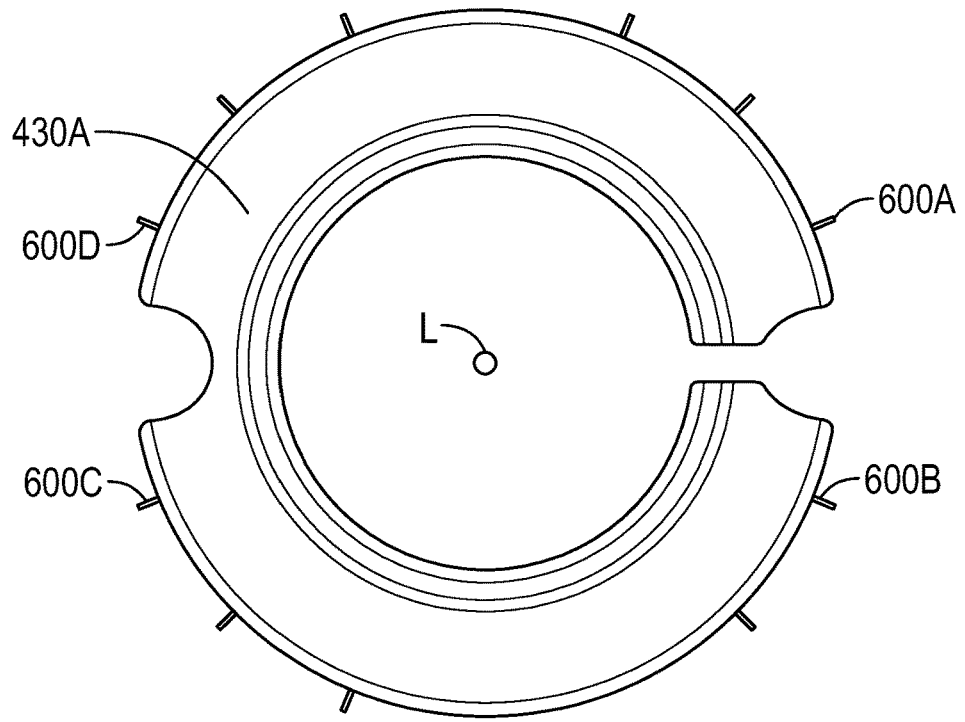

FIG. 7 illustrates an air insulation cavity 430 within bearing cap 300, as viewed down longitudinal axis L, according to an embodiment. Air insulation cavity 430A is shown in both a transparent view (top), as well as a solid view (bottom). Bearing cap 300 may be printed, during an additive manufacturing process, with a plurality of powder removal holes 600. For purposes of illustration, four powder strategically placed removal holes 600A, 600B, 600C, and 600D are labeled. The goal with the strategic placement of these powder removal holes 600A-600D is to minimize the number of powder removal holes 600 required for powder removal, in order to minimize stress concentration locations and reduce manufacturing post-processing. Although a certain number of powder removal holes 600 are illustrated, it should be understood that an embodiment may consist of fewer or more powder removal holes 600 than those illustrated.

As a first example, bearing cap 300 may be rotated 90 degrees from the illustrated orientation, such that powder removal holes 600A and 600B are at the top and powder removal holes 600C and 600D are at the bottom, and then air or other fluid may be supplied through powder removal holes 600A and 600B, as inlets, to flush powder out through powder removal holes 600C and 600D, as outlets. As a second example, bearing cap 300 may be rotated 67.5 degrees, such that powder removal holes 600A and 600C are vertically straight, and then air or other fluid may be supplied through powder removal hole 600A, as an inlet, to flush powder out through powder removal hole 600C, as an outlet. Similarly, as a third example, bearing cap 300 may be rotated 112.5 degrees, such that powder removal holes 600B and 600D are vertically straight, and then air or other fluid may be supplied through powder removal hole 600B, as an inlet, to flush powder out through powder removal hole 600D, as an outlet. It should be understood that bearing cap 300 could be rotated into various other orientations that enable gravity to assist in powder removal, using at least one powder removal hole 600 as an inlet and at least one powder removal hole 600 as an outlet.

Figure 8:
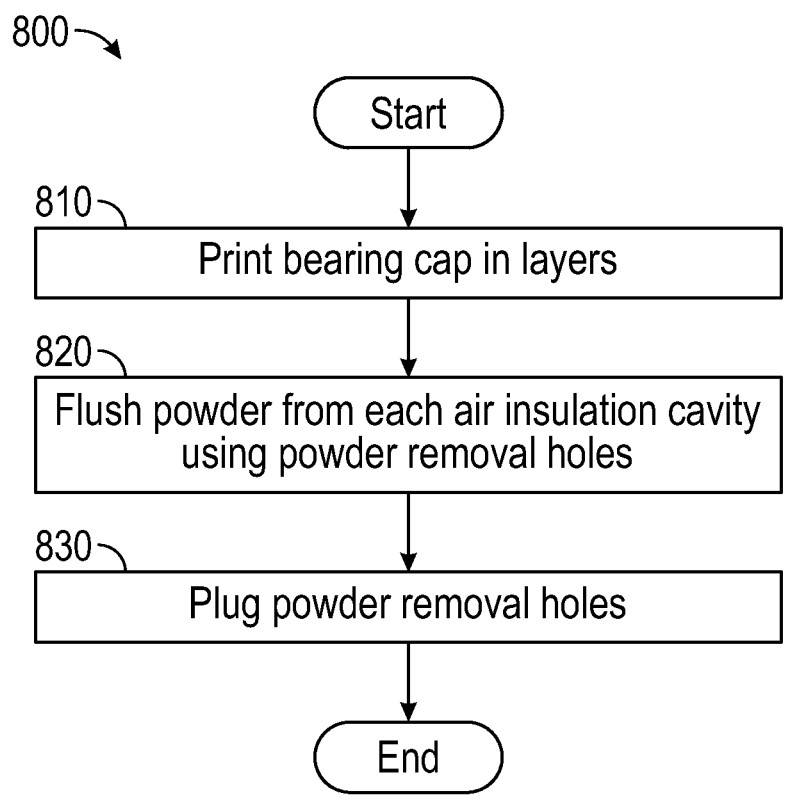
FIG. 8 illustrates an additive manufacturing process for manufacturing bearing cap, according to an embodiment.

FIG. 8 illustrates an additive manufacturing process 800 for manufacturing bearing cap 300, according to an embodiment. Initially, in subprocess 810, bearing cap 300 may be printed in layers using additive manufacturing and a suitable material (e.g., nickel alloy such as IN718). Bearing cap 300 may be printed to include first surface 410 on a first side, wherein first surface 410 is annular around longitudinal axis L, second surface 420 on a second side that is opposite and downstream from the first side opposite and downstream from meaning that, with respect to a region on the first surface 420, there is a corresponding region on the second surface 420 which is separated from the region on the first surface 410 in a direction parallel to the longitudinal axis L and further away from the compressor 120, wherein second surface 420 is annular around longitudinal axis L, at least one air insulation cavity 430 (e.g., 430A) between first surface 410 and second surface 420, wherein the at least one air insulation cavity 430 is annular around longitudinal axis L, and one or more powder removal holes 600 extending from one or both of a radially innermost end (e.g., 437) of the at least one air insulation cavity 430 or a radially outermost end (e.g., 433) of the at least one air insulation cavity 430 to an external environment of bearing cap 300. In a cross-sectional plane that includes longitudinal axis L, a radially outer first portion 432 of the at least one air insulation cavity 430 may extend away from longitudinal axis L and towards the second side at a first angle with respect to longitudinal axis L, a radially inner second portion 436 of the at least one air insulation cavity 430 may extend away from longitudinal axis L and towards the first side at a second angle with respect to longitudinal axis L, and/or one or both of the radially innermost end (e.g., 437) of the at least one air insulation cavity 430 or the radially outermost end (e.g., 433) of the at least one air insulation cavity 430 may have a teardrop shape.

In subprocess 820, powder may be flushed from the at least one air insulation cavity 430 via the one or more powder removal holes 600. For example, as discussed above, the printed bearing cap 300 may be rotated to provide at least one powder removal hole 600 at the top, to be used as an inlet, and at least one powder removal hole 600 at the bottom, to be used as an outlet. Then, bearing cap 300 may be mounted on a fixture to remove powder using gravity and vibrations to allow the powder to be expelled. Additionally, a fluid, such as air or a liquid, may be pumped through the inlet to flush powder out of the at least one air insulation cavity 430 through the outlet. This flushing may be performed in a plurality of steps. For example, a first flush may be performed while bearing cap 300 is still affixed to the build plate on which bearing cap 300 was printed, and a second flush may be performed after bearing cap 300 has been removed from the build plate (e.g., by an electrical discharging machining (EDM) wire cut).

Alternatively, the printed bearing cap 300 may undergo heat treating to relieve residual stresses in printed bearing cap 300. Heat treatment can alleviate stresses by subjecting printed bearing cap 300 to elevated temperatures followed by controlled cooling. This reduces the risk of distortion, warping, or cracking and improves dimensional stability.

In subprocess 830, after flushing the powder from the at least one air insulation cavity 430, the one or more powder removal holes 600 may be plugged. For example, a pin may be welded or otherwise fixed into each powder removal hole 600, to thereby seal the at least one air insulation cavity 430.

INDUSTRIAL APPLICABILITY

Bearing caps protect the bearings in a gas turbine engine 100, and generally comprise an oil sump to provide lubricating oil to the bearing. However, in a traditional bearing cap, the oil-wetted surface that defines the oil sump may experience temperatures of over 400 degrees Fahrenheit. Such hot temperatures can result in oil degradation, oil varnish, and coking, which can lead to blockage in the oil drain and, in extreme cases, can result in a fire.

Accordingly, a bearing cap 300 is disclosed that reduces the temperatures experienced by the oil-wetted second surface 420. In particular, bearing cap 300 may comprise one or more air insulation cavities 430, which provide a thermal barrier to heat flux 500 through bearing cap 300. The air insulation cavity(ies) 430 may collectively form a profile that matches a profile of oil sump 425, to provide a thermal barrier around most or the entirety of oil sump 425. As a result, the hot-mass/cold-mass ratio between first surface 410 and second surface 420 can be significantly reduced.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The term "annular", as used herein, encompasses an object shaped to surround completely an axis of rotation (e.g., the object is disposed around a full 360 degrees of an axis of rotation), as well as an object shaped to surround only partially an axis of rotation (e.g., the object is disposed around 180 degrees of an axis of rotation).

The preceding detailed description is merely exemplary in nature and is not intended to limit the invention or the application and uses of the invention. The described embodiments are not limited to usage in conjunction with a particular type of industrial context or with a particular type of machine. Hence, although the present embodiments are, for convenience of explanation, depicted and described as being implemented with gas turbine engines, it will be appreciated that it can be implemented for various other types of machines with bearing caps, and in various other environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A bearing cap for a gas turbine engine, the bearing cap comprising:
    a first surface on a first side, wherein the first surface is annular around a longitudinal axis;
    a second surface on a second side that is opposite and downstream from the first side, wherein the second surface is annular around the longitudinal axis;
    one or more air insulation cavities between the first surface and the second surface, wherein each of the one or more air insulation cavities is annular around the longitudinal axis; and
    an annular mixed air cavity upstream from the one or more air insulation cavities.

2. The bearing cap of claim 1, wherein, in a cross-sectional plane that includes the longitudinal axis, at least a portion of at least one of the one or more air insulation cavities extends away from the longitudinal axis at a non-zero angle with respect to the longitudinal axis.

3. The bearing cap of claim 1, wherein, in a cross-sectional plane that includes the longitudinal axis, at least a portion of at least one of the one or more air insulation cavities extends away from the longitudinal axis at a non-zero, non-perpendicular angle with respect to the longitudinal axis.

4. The bearing cap of claim 1, wherein, in a cross-sectional plane that includes the longitudinal axis, a first portion of at least one of the one or more air insulation cavities extends away from the longitudinal axis at a non-zero first angle with respect to the longitudinal axis, and a second portion of the at least one air insulation cavity extends away from the longitudinal axis at a second angle with respect to the longitudinal axis, wherein the second angle is different from the first angle.

5. A bearing cap for a gas turbine engine, the bearing cap comprising:
    a first surface on a first side, wherein the first surface is annular around a longitudinal axis;
    a second surface on a second side that is opposite and downstream from the first side, wherein the second surface is annular around the longitudinal axis;
    one or more air insulation cavities between the first surface and the second surface, wherein each of the one or more air insulation cavities is annular around the longitudinal axis;
    wherein, in a cross-sectional plane that includes the longitudinal axis, a radially outer first portion of at least a first one of the one or more air insulation cavities extends away from the longitudinal axis and towards the second side at a first angle with respect to the longitudinal axis, and a radially inner second portion of the first air insulation cavity extends away from the longitudinal axis and towards the first side at a second angle with respect to the longitudinal axis.

6. The bearing cap of claim 5, wherein, in the cross-sectional plane, one or both of a radially innermost end of the first air insulation cavity or a radially outermost end of the first air insulation cavity has a teardrop shape.

7. The bearing cap of claim 5, further comprising one or more powder removal holes extending from one or both of a radially innermost end of the first air insulation cavity or a radially outermost end of the first air insulation cavity to an external environment of the bearing cap.

8. The bearing cap of claim 5, further comprising one or more powder removal holes extending from a vertex formed at a point at which the first portion and the second portion of the first air insulation cavity meet.

9. The bearing cap of claim 5, wherein the one or more air insulation cavities are a plurality of air insulation cavities, and wherein, in the cross-sectional plane, a second one of the plurality of air insulation cavities is shorter in total length than the first air insulation cavity.

10. The bearing cap of claim 9, wherein, in the cross-sectional plane, the second air insulation cavity is parallel to the longitudinal axis.

11. The bearing cap of claim 10, wherein the second air insulation cavity is downstream from a radially innermost end of the first air insulation cavity.

12. The bearing cap of claim 9, further comprising one or more powder removal holes extending from at least one end of the second air insulation cavity to an external environment of the bearing cap.

13. The bearing cap of claim 1, wherein the second surface defines an oil sump on the second side.

14. The bearing cap of claim 13, wherein, in the cross-sectional plane, a profile of the one or more air insulation cavities matches a profile of the oil sump.

15. The bearing cap of claim 1, further comprising one or more seal rings on a radially inward facing surface of the bearing cap that encircles a central channel through the bearing cap.

16. A gas turbine engine comprising:
   a compressor;
   a combustor downstream from the compressor;
   a turbine downstream from the combustor; and
   the bearing cap of claim 1, positioned between the compressor and the combustor.

17. A bearing cap for a gas turbine engine, the bearing cap comprising:
   a first surface on a first side, wherein the first surface is annular around a longitudinal axis;
   a second surface on a second side that is opposite and downstream from the first side, wherein the second surface is annular around the longitudinal axis and defines an oil sump on the second side; and
   a plurality of air insulation cavities between the first surface and the second surface, wherein each of the plurality of air insulation cavities is annular around the longitudinal axis, and wherein the plurality of air insulation cavities comprises
   a first air insulation cavity that, in a cross-sectional plane that includes the longitudinal axis, comprises a radially outer first portion that extends away from the longitudinal axis and towards the second side at a first non-zero angle with respect to the longitudinal axis, and a radially inner second portion that extends away from the longitudinal axis and towards the first side at a second non-zero angle with respect to the longitudinal axis, wherein a profile of the first air insulation cavity matches a profile of the oil sump, and
   a second air insulation cavity positioned downstream from a radially innermost end of the first air insulation cavity.

\* \* \* \* \*